US012763897B2

(12) United States Patent
Kim et al.

(10) Patent No.: US 12,763,897 B2
(45) Date of Patent: Oct. 13, 2026

(54) METHOD AND DEVICE FOR TRANSMITTING SIGNAL THROUGH REFLECTION PLATE IN WIRELESS COMMUNICATION SYSTEM

(71) Applicant: LG ELECTRONICS INC., Seoul (KR)

(72) Inventors: Sungjin Kim, Seoul (KR); Jaeky Oh, Seoul (KR); Jaehoon Chung, Seoul (KR); Jae Yong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 18/692,751

(22) PCT Filed: Sep. 16, 2021

(86) PCT No.: PCT/KR2021/012708
§ 371 (c)(1),
(2) Date: Mar. 15, 2024

(87) PCT Pub. No.: WO2023/042938
PCT Pub. Date: Mar. 23, 2023

(65) Prior Publication Data
US 2024/0388395 A1 Nov. 21, 2024

(51) Int. Cl.
*H04L 5/00* (2006.01)
*H04B 7/04* (2017.01)

(52) U.S. Cl.
CPC ....... *H04L 5/0048* (2013.01); *H04B 7/04013* (2023.05)

(58) Field of Classification Search
CPC ............... H04W 24/10; H04W 56/001; H04W 72/0453; H04W 72/046; H04B 17/101; H04B 7/0617
USPC .......................................................... 370/329
See application file for complete search history.

(56) References Cited

U.S. PATENT DOCUMENTS

2021/0126359 A1* 4/2021 Kim ....................... H04B 7/145
2023/0021768 A1* 1/2023 Fayazbakhsh ....... H04B 7/0695

FOREIGN PATENT DOCUMENTS

CN 108024268 A * 5/2018 ........... H04B 7/0408

OTHER PUBLICATIONS

"Coded Federated Learning", Sagar Dhakal, Saurav Prakash, Yair Yona, Shilpa Talwar, Nageen Himayat, Intel Labs (Year: 2020).*

(Continued)

*Primary Examiner* — Intekhaab A Siddiquee
(74) *Attorney, Agent, or Firm* — LEE, HONG, DEGERMAN, KANG & WAIMEY

(57) ABSTRACT

The present disclosure may provide a terminal operation method in a wireless communication system. In this case, the terminal operation method may comprise the steps of: receiving reflection plate allocation information from a base station; transmitting one or more reference signals to the base station through a selected reflection plate on the basis of the reflection plate allocation information; acquiring phase information of the reflection plate from the base station; identifying channel information of a terminal on the basis of the phase information of the reflection plate; and transmitting a signal on the basis of the channel information.

14 Claims, 13 Drawing Sheets

(56) References Cited

OTHER PUBLICATIONS

"Federated Learning via Intelligent Reflecting Surface", Zhibin Wang, Student Member, IEEE, Jiahang Qiu, Yong Zhou, Member, IEEE, Yuanming Shi, Member, IEEE, Liqun Fu, Senior Member, IEEE, Wei Chen, Senior Member, IEEE, and Khaled B. Letaief, Fellow, IEEE (Year: 2020).*

"Federated Machine Learning for Intelligent IoT via Reconfigurable Intelligent Surface", Kai Yang, Yuanming Shi, Yong Zhou, Zhanpeng Yang, Liqun Fu, and Wei Chen (Year: 2020).*

"The Road Towards 6G: A Comprehensive Survey", Wei Jiang 1 (Senior Member, IEEE), Bin Han (Member, IEEE), Mohammad Asif Habibi , and Hans Dieter Schotten (Member, IEEE) (Year: 2021).*

"Over-the-Air Computation via Reconfigurable Intelligent Surface", Wenzhi Fang, Student Member, IEEE, Yuning Jiang, Member, IEEE, Yuanming Shi, Senior Member, IEEE, Yong Zhou, Member, IEEE, Wei Chen, Senior Member, IEEE, and Khaled B. Letaief, Fellow, IEEE (Year: 2021).*

* cited by examiner

METHOD AND DEVICE FOR TRANSMITTING SIGNAL THROUGH REFLECTION PLATE IN WIRELESS COMMUNICATION SYSTEM

CROSS-REFERENCE TO RELATED APPLICATION(S)

This application is the National Stage filing under 35 U.S.C. 371 of International Application No. PCT/KR2021/012708, filed on Sep. 16, 2021, the contents of which are all incorporated by reference herein in its entirety.

TECHNICAL FIELD

The following description relates to a wireless communication system and a method and device for causing a terminal and a base station to transmit and receive signals using a reflecting surface in a wireless communication system.

In particular, it relates to a method and device for performing wireless communication based on efficient Aircomp federated learning using a reflecting surface in a wireless communication system.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure relates to a method and device for causing a terminal and a base station to transmit and receive signals using a reflecting surface in a wireless communication system.

The present disclosure may provide a method of mapping a reflecting surface and a terminal in an environment where a plurality of reflecting surfaces and a plurality of terminals coexist.

The present disclosure may provide a method of performing communication based on Aircomp federated learning in an environment where a plurality of reflecting surfaces and a plurality of terminals coexist.

The present disclosure may provide a method of saving radio resources by scheduling wireless combination with a plurality of reflecting surfaces and a base station when a plurality of terminals performs communication based on federated learning in consideration of a case where an area covered by one base station is reduced in next-generation communication (e.g., 6G).

Technical objects to be achieved in the present disclosure are not limited to what is mentioned above, and other technical objects not mentioned therein can be considered from the embodiments of the present disclosure to be described below by those skilled in the art to which a technical configuration of the present disclosure is applied.

As an example of the present disclosure, a method of operating a terminal in a wireless communication system may comprise receiving reflecting surface allocation information from a base station, transmitting at least one reference signal to the base station through a selected reflecting surface based on the reflecting surface allocation information, obtaining phase information of the reflecting surface from the base station, identifying channel information of the terminal based on the phase information of the reflecting surface, and transmitting a signal based on the channel information.

As an example of the present disclosure, a method of operating a base station in a wireless communication system may comprise transmitting reflecting surface allocation information to each of a plurality of terminals, receiving at least one reference signal from a first terminal among the plurality of terminals through a selected reflecting surface, generating phase information of the reflecting surface based on the received at least one reference signal and transmitting the generated phase information of the reflecting surface to the first terminal, generating channel information of the first terminal based on the phase information and transmitting the channel information to the first terminal, and receiving a signal from the first terminal based on the channel information.

As an example of the present disclosure, a terminal in a wireless communication system may comprise a transceiver and a processor coupled to the transceiver. The processor may receive reflecting surface allocation information from a base station using the transceiver, transmit at least one reference signal to the base station through a selected reflecting surface based on the reflecting surface allocation information using the transceiver, obtain phase information of the reflecting surface from the base station using the transceiver, identify channel information of the terminal based on the phase information of the reflecting surface, and transmit a signal based on the channel information using the transceiver.

As an example of the present disclosure, a base station in a wireless communication system may comprise a transceiver and a processor coupled to the transceiver. The processor may transmit reflecting surface allocation information to each of a plurality of terminals using the transceiver:

receive at least one reference signal from a first terminal among the plurality of terminals through a selected reflecting surface using the transceiver, generate phase information of the reflecting surface based on the received at least one reference signal and transmit the generated phase information of the reflecting surface to the first terminal using the transceiver, generate channel information of the first terminal based on the phase information and transmit the channel information to the first terminal using the transceiver, and receive a signal from the first terminal based on the channel information using the transceiver.

As an example of the present disclosure, a device may comprise at least one memory and at least one processor functionally coupled to the at least one memory. The processor may control the device to transmit reflecting surface allocation information to each of a plurality of terminals, receive at least one reference signal from a first terminal among the plurality of terminals through a selected reflecting surface, generate phase information of the reflecting surface based on the received at least one reference signal, transmit the generated phase information of the reflecting surface to the terminal, generate channel information of the first terminal based on the phase information and transmit the channel information to the first terminal and receive a signal from the first terminal based on the channel information.

As an example of the present disclosure, a non-transitory computer-readable medium storing at least one instruction may comprise the at least one instruction executable by a processor. The at least one instruction may comprises transmitting reflecting surface allocation information to each of a plurality of terminals, receiving at least one reference signal from a first terminal among the plurality of terminals through a selected reflecting surface, generating phase information of the reflecting surface based on the received at least one reference signal, transmitting the generated phase information of the reflecting surface to the terminal, generating channel information of the first terminal based on the phase information and transmitting the channel information to the first terminal, and receiving a signal from the first terminal based on the channel information.

The following matters may be commonly applied to the above-described base station, terminal, device and computer recording medium.

As an example of the present disclosure, a plurality of terminals including the terminal may perform communication with the base station based on Aircomp federated learning.

As an example of the present disclosure, based on the plurality of terminals performing communication with the base station based on Aircomp federated learning, each of the plurality of terminals may generate each local model information based on first global model information, the local model information of the plurality of terminals may be transmitted to the base station based on the same radio resource, and the base station may update the first global model information to second global model information based on the local model information.

As an example of the present disclosure, the base station may transfer the updated second global model information to each of the plurality of terminals.

As an example of the present disclosure, the signal transmitted based on the channel information may be local model information of the terminal.

As an example of the present disclosure, the base station may perform communication based on the plurality of terminals and a plurality of reflecting surfaces, and, based on communication with the plurality of terminals being performed based on Aircomp-type federated learning, one or less reflecting surface may be selected for each of the plurality of terminals, and information about the selected one or less reflecting surface may be transferred based on the reflecting surface allocation information.

As an example of the present disclosure, based on the terminal transmitting the at least one reference signal to the base station through the selected reflecting surface based on the reflecting surface allocation information, each of the at least one reference signal may be transmitted to the base station through the reflecting surface with a different phase.

As an example of the present disclosure, based on the terminal transmitting a first reference signal of the at least one reference signal to the base station through the reflecting surface, the terminal may transfer, to the reflecting surface, information about the first reference signal and phase information of the reflecting surface based on the first reference signal, and the reflecting surface may transfer the first reference signal to the base station through the information about the first reference signal and the phase information of the reflecting surface based on the first reference signal.

As an example of the present disclosure, the base station may obtain optimal phase information based on the at least one reference signal transmitted based on the different phase, and index information of a reference signal corresponding to the obtained optima phase information may be transmitted to the terminal.

As an example of the present disclosure, the terminal may select a reference signal transmitted to the base station based on the index information of the reference signal and transmit the reference signal to the base station, and each of a plurality of terminals including the terminal may receive index information of each of reference signals from the base station, select each of the reference signals based on the index information of the reference signal and transmit the reference signal to the base station.

As an example of the present disclosure, wherein the reference signals of the plurality of terminals may be orthogonal signals.

As an example of the present disclosure, the base station may measure an effect channel for each of the plurality of terminals based on the reference signal received from each of the plurality of terminals, and information about the measured effect channel may be transferred to the plurality of terminals.

As is apparent from the above description, the embodiments of the present disclosure have the following effects.

In embodiments based on the present disclosure, a terminal and a base station may transmit and receive signals using a reflecting surface.

In embodiments based on the present disclosure, it is possible to provide a method of mapping a reflecting surface and a terminal in an environment where a plurality of reflecting surfaces and a plurality of terminals coexist.

In embodiments based on the present disclosure, it is possible to provide a method of performing communication based on Aircomp federated learning in an environment where a plurality of reflecting surfaces and a plurality of terminals coexist.

In embodiments based on the present disclosure, it is possible to provide a method of saving radio resources by scheduling wireless combination with a plurality of reflecting surfaces and a base station when a plurality of terminals performs communication based on federated learning in consideration of a case where an area covered by one base station is reduced in next-generation communication (e.g., 6G).

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure.

That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
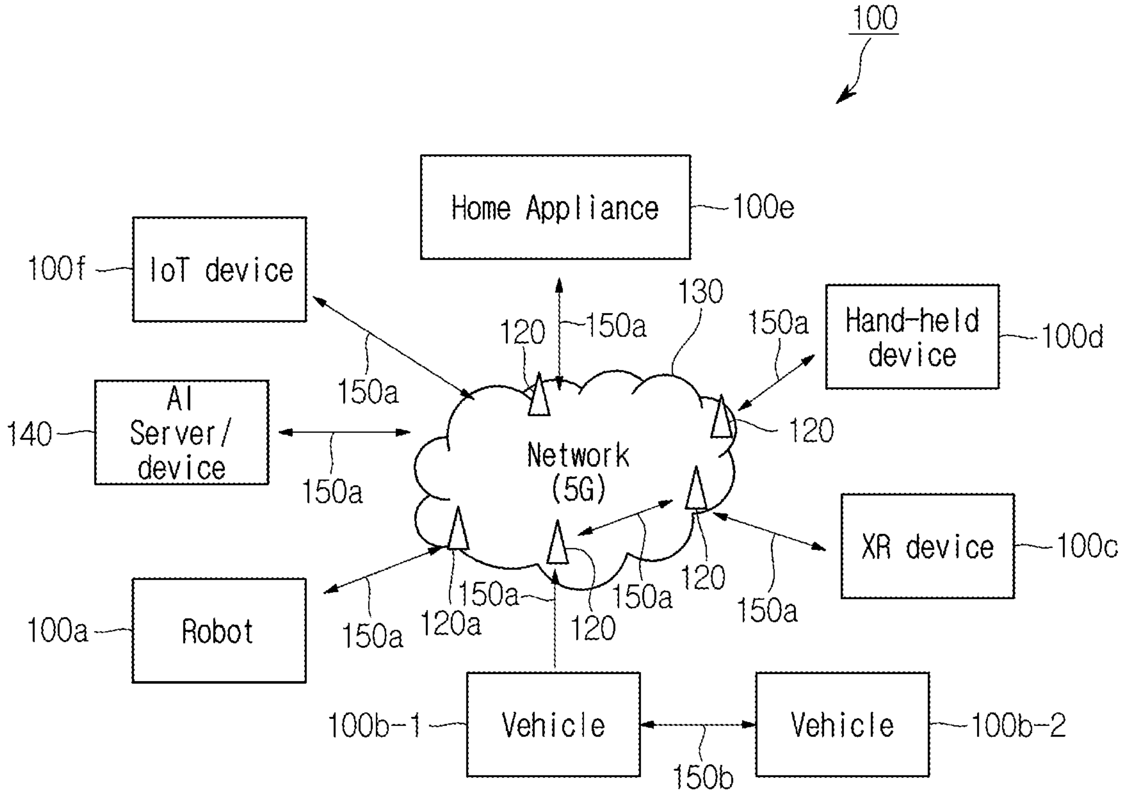
FIG. 1 illustrates an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.XXX.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Communication System Applicable to the Present Disclosure

Figure 2:
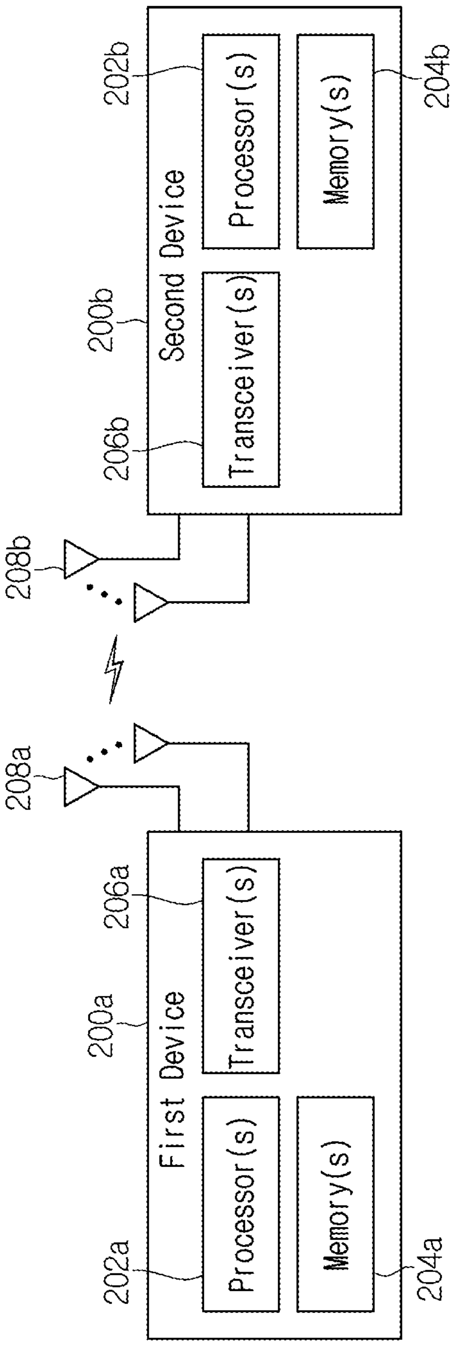
FIG. 2 illustrates an example of a wireless apparatus applicable to the present disclosure.

FIG. 2 illustrates an example of a wireless device applicable to the present disclosure.

Referring to FIG. 2, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas

208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
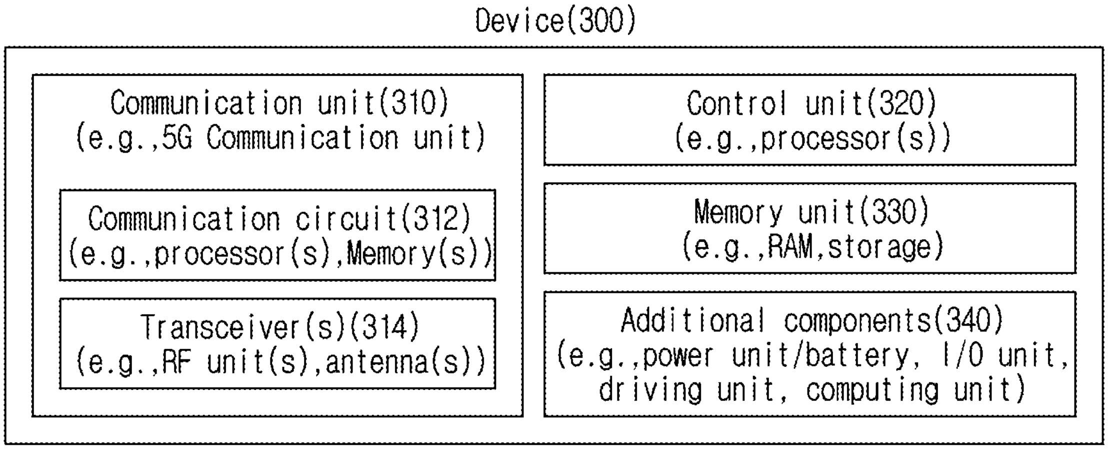
FIG. 3 illustrates another example of a wireless device applicable to the present disclosure.

FIG. 3 illustrates another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIGS. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
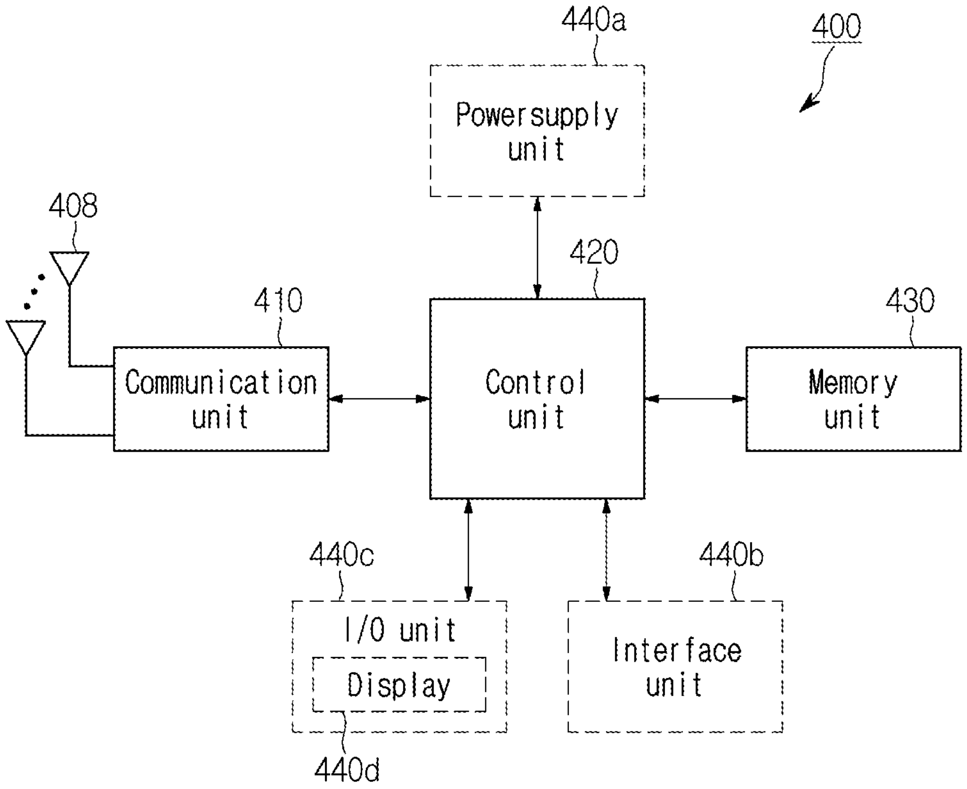
FIG. 4 illustrates an example of an AI device applied to the present disclosure.

FIG. 4 illustrates an example of an AI device applied to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
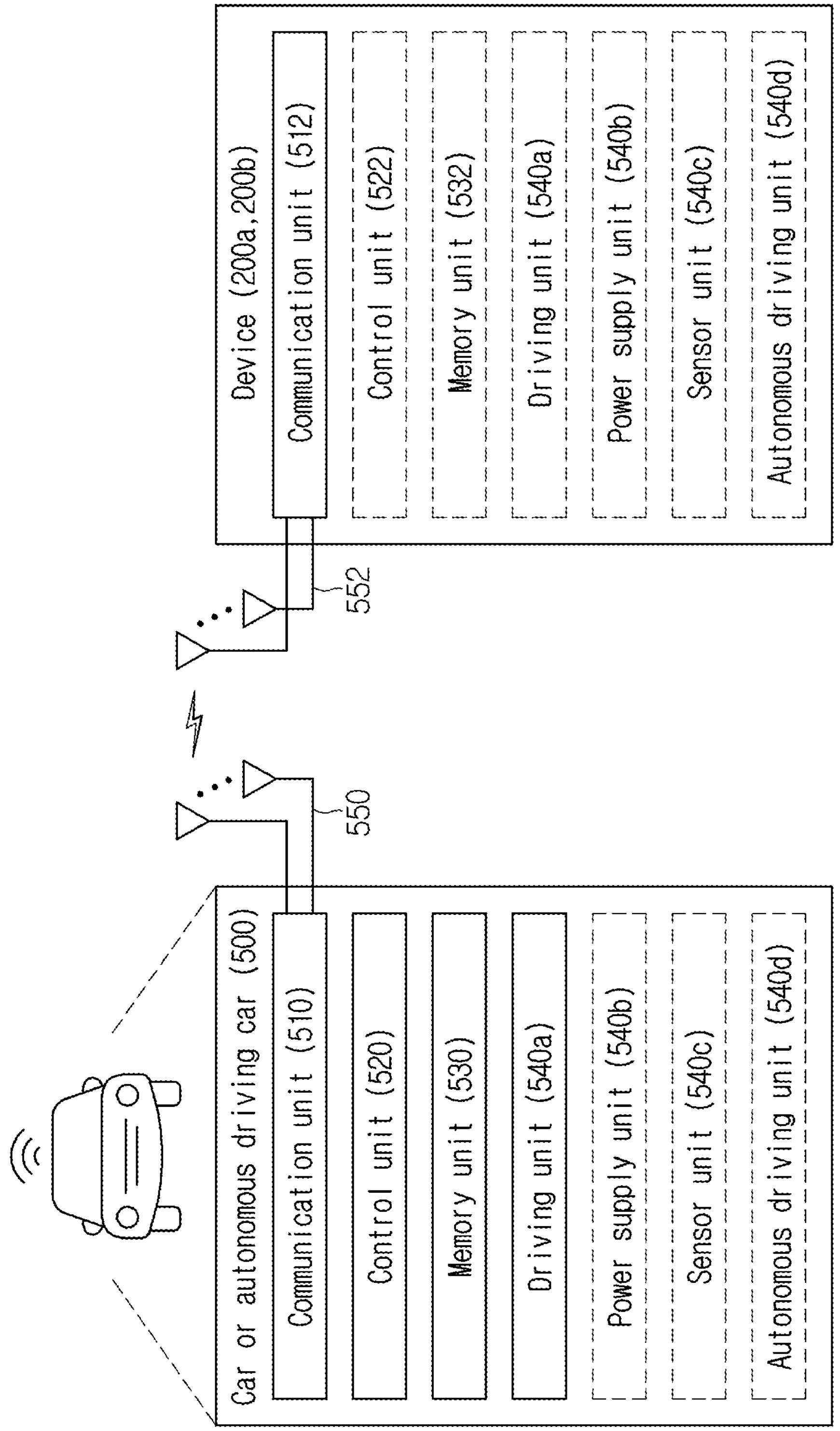
FIG. 5 illustrates an example of a car or an autonomous driving car applicable to the present disclosure.

FIG. 5 illustrates an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
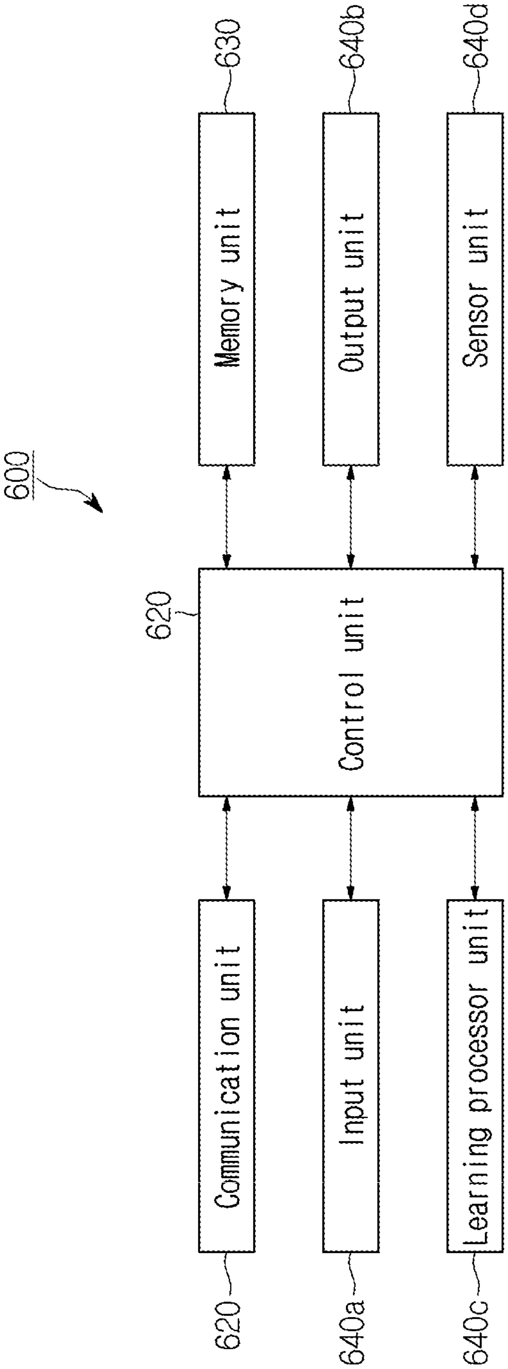
FIG. 6 illustrates an example of an AI device applied to the present disclosure.

FIG. 6 illustrates an example of an AI device applied to the present disclosure. For example, the AI device may be implemented as a fixed device or a movable device such as TV, projector, smartphone, PC, laptop, digital broadcasting terminal, tablet PC, wearable device, set-top box (STB), radio, washing machine, refrigerator, digital signage, robot, vehicle, etc.

Referring to FIG. 6, the AI device 600 may include a communication unit 610, a control unit 620, a memory unit 630, an input/output unit 640*a*/640*b*, a learning processor unit 640*c* and a sensor unit 640*d*. Blocks 610 to 630/640*a* to 640*d* may correspond to blocks 310 to 330/340 of FIG. 3, respectively.

The communication unit 610 may transmit and receive a wired and wireless signal (e.g., sensor information, user input, learning model, control signal, etc.) to and from external devices such as another AI device (e.g., 100*x*, 120, 140 in FIG. 1) or an AI server (140 in FIG. 1) using wired/wireless communication technology. To this end, the communication unit 610 may transmit information in the memory unit 630 to an external device or send a signal received from an external device to the memory unit 630.

The control unit 620 may determine at least one executable operation of the AI device 600 based on information determined or generated using a data analysis algorithm or machine learning algorithm. In addition, the control unit 620 may control the components of the AI device 600 to perform the determined operation. For example, the control unit 620 may request, search, receive, or utilize the data of the learning processor 640*c* or the memory unit 630, and control the components of the AI device 600 to perform predicted operation or operation determined to be preferred among at least one executable operation. In addition, the control unit 620 collects history information including a user's feedback on the operation content or operation of the AI device 600, and stores it in the memory unit 630 or the learning processor 640*c* or transmit it to an external device such as the AI server (140 in FIG. 1). The collected history information may be used to update a learning model.

The memory unit 430 may store data supporting various functions of the AI device 400. For example, the memory unit 430 may store data obtained from the input unit 440*a*, data obtained from the communication unit 410, output data of the learning processor unit 440*c*, and data obtained from the sensor unit 440. Also, the memory unit 430 may store control information and/or software code required for operation/execution of the control unit 420.

The input unit 640*a* may obtain various types of data from the outside of the AI device 600. For example, the input unit 620 may obtain learning data for model learning, input data to which the learning model is applied, etc. The input unit 640*a* may include a camera, a microphone and/or a user input unit, etc. The output unit 640*b* may generate audio, video or tactile output. The output unit 640*b* may include a display unit, a speaker and/or a haptic module. The sensor unit 640 may obtain at least one of internal information of the AI device 600, surrounding environment information of the AI device 600 or user information using various sensors. The sensor unit 640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 640*c* may train a model composed of an artificial neural network using learning data. The learning processor unit 640*c* may perform AI processing together with the learning processor unit of the AI server (140 in FIG. 1). The learning processor unit 640*c* may process information received from an external device through the communication unit 610 and/or information stored in the memory unit 630. In addition, the output value of the learning processor unit 640*c* may be transmitted to an external device through the communication unit 610 and/or stored in the memory unit 630.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 7:
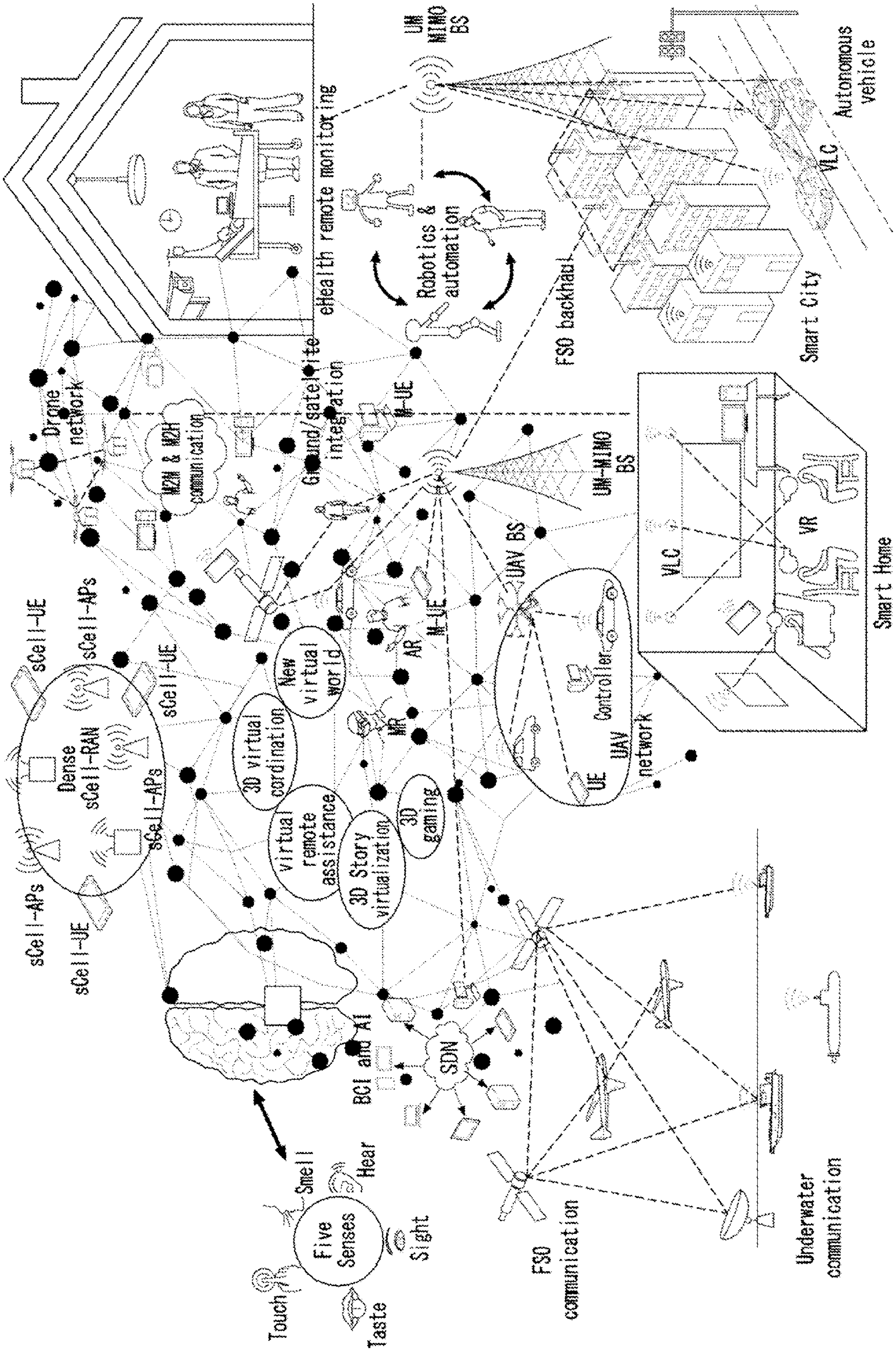
FIG. 7 illustrates an example of a communication structure providable in a 6th generation (6G) system applicable to the present disclosure.

FIG. 7 illustrates an example of a communication structure providable in a 6G system applicable to the present disclosure.

Referring to FIG. 7, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system.

Core Implementation Technology of 6G System

Artificial Intelligence (AI)

The most important and newly introduced technology for the 6G system is AI. AI was not involved in the 4G system. 5G systems will support partial or very limited AI. However, the 6G system will support AI for full automation. Advances in machine learning will create more intelligent networks for real-time communication in 6G. Introducing AI in communication may simplify and enhance real-time data transmission. AI may use a number of analytics to determine how complex target tasks are performed. In other words, AI may increase efficiency and reduce processing delay.

Time consuming tasks such as handover, network selection, and resource scheduling may be performed instantly by using AI. AI may also play an important role in machine-to-machine, machine-to-human and human-to-machine communication. In addition, AI may be a rapid communication in a brain computer interface (BCI). AI-based communication systems may be supported by metamaterials, intelligent structures, intelligent networks, intelligent devices, intelligent cognitive radios, self-sustained wireless networks, and machine learning.

Recently, attempts have been made to integrate AI with wireless communication systems, but application layers, network layers, and in particular, deep learning have been focused on the field of wireless resource management and allocation. However, such research is gradually developing into the MAC layer and the physical layer, and in particular, attempts to combine deep learning with wireless transmission are appearing in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based multiple input multiple output (MIMO) mechanism, and AI-based resource scheduling and allocation may be included.

Machine learning may be used for channel estimation and channel tracking, and may be used for power allocation, interference cancellation, and the like in a downlink (DL) physical layer. Machine learning may also be used for antenna selection, power control, symbol detection, and the like in a MIMO system.

However, the application of DNN for transmission in the physical layer may have the following problems.

Deep learning-based AI algorithms require a lot of training data to optimize training parameters. However, due to limitations in obtaining data in a specific channel environment as training data, a lot of training data is used offline. This is because static training on training data in a specific channel environment may cause a contradiction between diversity and dynamic characteristics of a radio channel.

In addition, current deep learning mainly targets real signals. However, the signals of the physical layer of wireless communication are complex signals. In order to match the characteristics of a wireless communication signal, additional research on a neural network that detects a complex domain signal is required.

Hereinafter, machine learning will be described in greater detail.

Machine learning refers to a series of operations for training a machine to create a machine capable of performing a task which can be performed or is difficult to be performed by a person. Machine learning requires data and a learning model. In machine learning, data learning methods may be largely classified into three types: supervised learning, unsupervised learning, and reinforcement learning.

Neural network learning is to minimize errors in output. Neural network learning is a process of updating the weight of each node in the neural network by repeatedly inputting learning data to a neural network, calculating the output of the neural network for the learning data and the error of the target, and backpropagating the error of the neural network from the output layer of the neural network to the input layer in a direction to reduce the error.

Supervised learning uses learning data labeled with correct answers in the learning data, and unsupervised learning may not have correct answers labeled with the learning data. That is, for example, learning data in the case of supervised learning related to data classification may be data in which each learning data is labeled with a category. Labeled learning data is input to the neural network, and an error may be calculated by comparing the output (category) of the neural network and the label of the learning data. The calculated error is backpropagated in a reverse direction (i.e., from the output layer to the input layer) in the neural network, and the connection weight of each node of each layer of the neural network may be updated according to backpropagation. The amount of change in the connection weight of each updated node may be determined according to a learning rate. The neural network's computation of input data and backpropagation of errors may constitute a learning cycle (epoch). The learning rate may be applied differently according to the number of iterations of the learning cycle of the neural network. For example, in the early stages of neural network learning, a high learning rate is used to allow the neural network to quickly achieve a certain level of performance to increase efficiency, and in the late stage of learning, a low learning rate may be used to increase accuracy.

A learning method may vary according to characteristics of data. For example, when the purpose is to accurately predict data transmitted from a transmitter in a communication system by a receiver, it is preferable to perform learning using supervised learning rather than unsupervised learning or reinforcement learning.

The learning model corresponds to the human brain, and although the most basic linear model may be considered, a paradigm of machine learning that uses a neural network structure with high complexity such as artificial neural networks as a learning model is referred to as deep learning.

The neural network cord used in the learning method is largely classified into deep neural networks (DNN), convolutional deep neural networks (CNN), and recurrent Boltzmann machine (RNN), and this learning model may be applied.

Terahertz (THz) Communication

THz communication is applicable to the 6G system. For example, a data rate may increase by increasing bandwidth.

This may be performed by using sub-THz communication with wide bandwidth and applying advanced massive MIMO technology.

Figure 8:
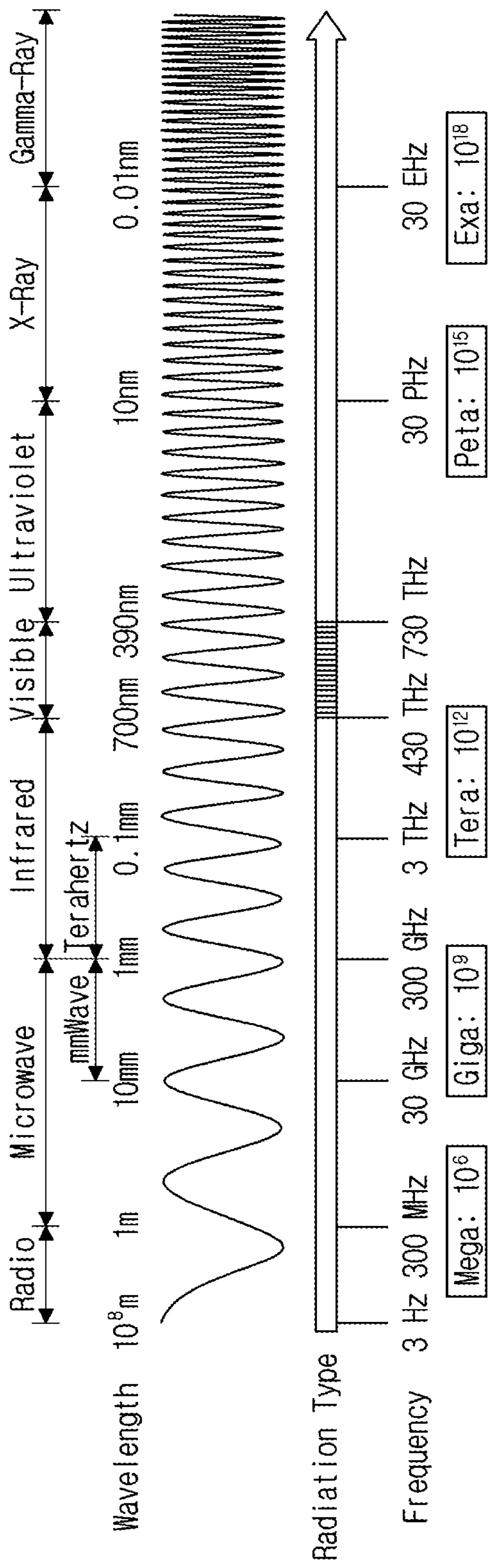
FIG. 8 illustrates an example of an electromagnetic spectrum applicable to the present disclosure.

FIG. 8 illustrates an example of an electromagnetic spectrum applicable to the present disclosure. For example, referring to FIG. 8, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Hereinafter, a method of controlling a wireless channel environment using a reflecting surface and performing communication between a base station and a terminal will be described. As an example, the reflecting surface may be an intelligent reflect surface (IRS). Additionally, as an example, the reflecting surface may be LIS (large intelligent surfaces). In other words, the shape of the reflecting surface may be implemented in various ways and may not be limited to a specific shape. As an example, in the following, it is referred to as a reflecting surface for convenience of explanation. Additionally, when a plurality of reflecting surfaces and a plurality of terminals coexist in a wireless channel environment, a method of selecting a reflecting surface may be necessary, and the method for this will be described below.

For example, when transmitting a signal in the THz band, it may be vulnerable to path loss. In consideration of the above, in order to overcome the limitations of the multi-access communication environment, the terminal and the base station may perform communication through a reflecting surface. The terminal and the base station may change the multi-access communication channel through the reflecting surface, and based on this, multiple paths can be secured and throughput can be improved to increase transmission efficiency.

As an example, a reflecting surface may generate a new wireless path by reflecting a wireless signal sent from the base station toward the terminal. Since the reflecting surface has nothing to do with communication other than adjusting the angle of reflection for the signal, there may be advantages in terms of complexity and power usage. However, when a reflecting surface is applied, a plurality of reflecting surfaces may be used in consideration of communication between the base station and a plurality of terminals.

At this time, when multi-access wireless communication is performed in an environment where a plurality of reflecting surfaces and a plurality of terminals exist, the overall transmission performance may vary depending on the mapping of the plurality of reflecting surfaces and the plurality of terminals. In other words, mapping between reflecting surfaces and terminals needs to be performed considering overall transmission performance. Therefore, in order to optimize overall performance, there is a need to determine which reflecting surface should be allocated to which terminal.

As an example, one reflecting surface may be allocated to only one terminal, which may be a single reflecting surface mode. However, even in the case of a single reflecting surface mode, considering the total number of cases considering the number of reflecting surfaces and the number of terminals, the number of channels that must be determined according to the number of terminals may increase to a factorial level. In other words, the complexity of selecting a reflecting surface may increase. Additionally, in the case of a multi-reflecting surface mode in which a plurality of reflecting surfaces are allocated to each terminal, the complexity of selecting a reflecting surface may further increase.

As another example, in the case of environments where complex terrain features exists within a cell or mobile terminals (e.g. vehicles), optimal reflecting surface selection needs to be determined in real time, and there may be limitations in a feedback method of channel information. Taking the above-mentioned points into consideration, a method of efficiently selecting a reflecting surface may be needed.

Figure 9:
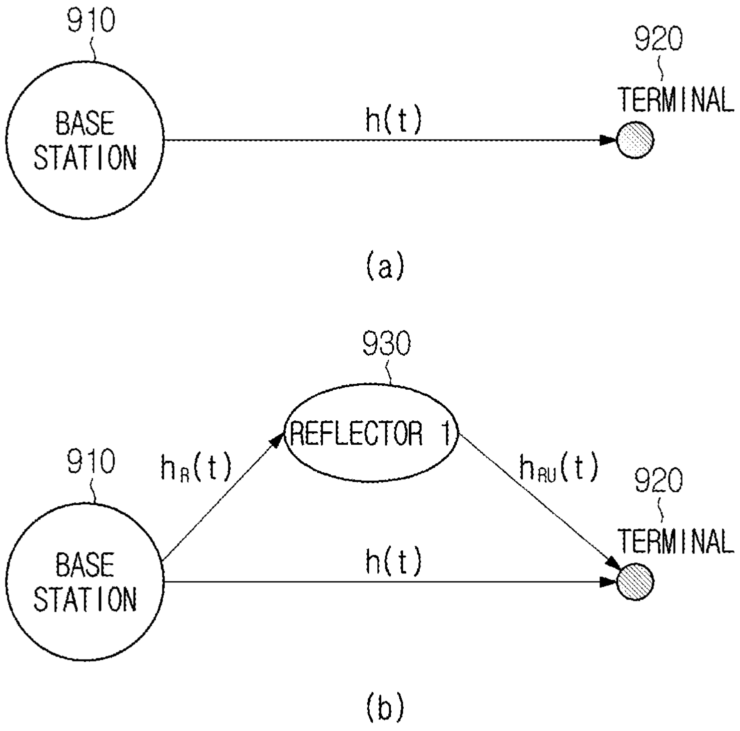
FIG. 9 is a diagram showing a method of performing communication based on a possible reflecting surface according to an embodiment of the present disclosure.

FIG. 9 is a diagram showing a method of performing communication based on a reflecting surface according to an embodiment of the present disclosure. Referring to FIG. 9(*a*), in existing wireless communication, a base station 910 may communicate directly with a terminal 920, and a channel environment between the base station 910 and the terminal 920 may be h(t). Here, when a transmission signal is x(t) and added noise is n(t), a signal received at a receiving end may be modeled as shown in Equation 1 below.

$$r(t) = h(t) * x(t) + n(t) \qquad \text{[Equation 1]}$$

At this time, as an example, referring to FIG. 9(*b*), when the base station 910 and the terminal 920 perform communication using a reflecting surface 930, the signal received at the receiving end may be modeled as shown in Equation 2 below.

$$r(t) = (h(t) + h_{RU}(t)\theta(t)h_R(t)) * x(t) + n(t) \qquad \text{[Equation 2]}$$

Here, $h_k(t)$ may be a channel environment between the base station 910 and the reflecting surface 930, and $h_{kU}(t)$ may be a channel environment between the terminal 920 and the reflecting surface 930. Additionally, θ(t) may be a characteristic of each reflecting surface. As an example, the reflecting surface may adjust at least one reflective element within the reflecting surface to have higher performance than a received signal of existing wireless communication, thereby increasing transmission efficiency. As an example, θ(t) may be a diagonal matrix consisting of the number of reflections, which is a system parameter of the reflecting surface, and may be expressed as Equation 3 below. Here, Equation 3 may represent θ(t) for a reflecting surface composed of M elements.

$$\theta(t) = \mathrm{diag}[\,\theta_1 \;\; \theta_2 \;\; \ldots \;\; \theta_M\,] \qquad \text{[Equation 3]}$$

Figure 10:
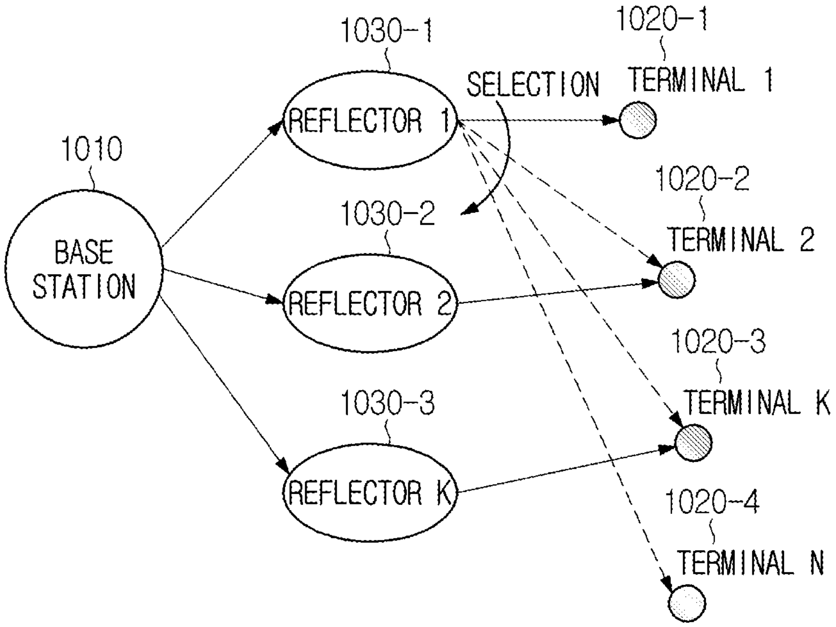
FIG. 10 is a diagram showing a smart radio environment (SRE) using a reflecting surface according to an embodiment of the present disclosure.

FIG. 10 is a diagram showing a smart radio environment (SRE) using a reflecting surface according to an embodiment of the present disclosure. Referring to FIG. 10, an environment in which a plurality of reflecting surfaces and a plurality of terminals coexist may be considered. Here, K reflecting surfaces 1030-1, 1030-2 and 1030-3 may be mapped one-to-one to the terminals based on a single reflecting surface mode. That is, among N terminals 1020-1, 1020-2, 1020-3 and 1020-4, K terminals 1020-1, 1020-2 and 1020-3 may be mapped to K reflecting surfaces 1030-1, 1030-2 and 1030-3. At this time, as an example, each of the reflecting surfaces 1, 2, . . . , K 1030-1, 1030-2 and 1030-3 select the terminals in order, but this is not optimal selection and performance gain may be limited.

For example, when a reflecting surface is selected in a wireless communication system, a base station 1010 needs to recognize channels between the reflecting surfaces 1030-1, 1030-2 and 1030-3 and the terminals 1020-1 and 1020-2, 1020-3, and 1020-4, in order to make optimal selection. In addition, there may be a limit because the optimal selection may be possible only when the base station maps the reflecting surfaces and the terminals by considering the number of all possible combinations of the reflecting surfaces and the terminals.

As an example, when the base station identifies a channel between each of the reflecting surfaces 1030-1, 1030-2 and 1030-3 and each of the terminals 1020-1, 1020-2, 1020-3 and 1020-4, each of the terminal 1020-1, 1020-2, 1020-3 and 1020-4 may measure {h[k,n]} which the channel with the reflecting surfaces 1030-1, 1030-2 and 1030-3 and report it to the base station 1010. When performing the above-described process, complexity may become very high and significant loss of wireless communication uplink capacity may occur. Therefore, there is a need for the base station 1010 to reduce complexity by selecting an optimal combination through trial and error without feedback of channel information from each of the terminals 1020-1, 1020-2, 1020-3, and 1020-4.

Additionally, as an example, a method of streamlining distributed artificial intelligence learning in a mobile communication system may be provided. When data for a plurality of terminals is distributed and present, a centralized learning method may be a method of sending each data from the terminals to the base station and performing learning at the base station. However, centralized learning that sends the data of the terminals to the base station may have limitations in data security. Therefore, a wireless federated learning method may be needed as a distributed learning method that does not send user data. At this time, the wireless federated learning method may be a method in which each terminal performs individual learning and transmits a local model update to the base station instead of transmitting the data of the terminals to the base station. At this time, the base station may transmit the combined value of local model updates to each terminal based on the local model updates received from the plurality of terminals. At this time, the above-described procedure may be continuously repeated, and distributed learning may be performed by a combination of the terminals.

Here, since the size of the local model is often large, if terminals participating in learning transmit information about the local model to the uplink channel using independent radio resources, radio resource loss may increase. Therefore, an air computing (Aircomp) method in which terminals send local instantaneous models to the uplink using the same radio resources and automatically combine them over the air may be used.

As an example, the air computing (Aircomp) method may be a method of performing transmission by applying a weight proportional to the inverse of the radio channel in order to combine the local models sent by the terminals into the same size.

As a specific example, model parameters of federated learning may be applied to a new communication system. Federated Learning may be applied to any of the following cases: protecting individual privacy, reducing load of the base station through distributed processing, and reducing traffic between the base station and the terminal. However, it may not be limited to this. At this time, as an example, traffic of local model parameters (e.g., weights and information of a deep neural network) may impose a large burden in a wireless communication environment, and taking this into consideration, traffic may be reduced through compression of the local model parameters described above or over the air computing (Aircomp).

However, the wireless communication environment in the communication system may vary. Additionally, the number of terminals requiring learning in the communication system may be set in various ways. Here, the communication system may require a flexible operating method and system rather than a fixed specific technology in consideration of the above-described environment. Through this, the resource efficiency of the communication system can be increased. As an example, the federated learning method through Aircomp may be a method of combining terminal model parameters. When transmission is performed based on the Aircomp, since the wireless communication channel performs signal transmission based on superposition properties, transmission efficiency can be increased and the load of the base station can be reduced. Additionally, the terminals may share the same communication channel. Therefore, when there are multiple terminals, transmission efficiency can be increased.

In consideration of the above, the federated learning method through terminal model parameter compression may be a method in which each terminal performs compression on data by considering the characteristics of the parameters and transmits it to the base station. Therefore, when the base station receives a signal based on the federated learning method, the base station needs to perform operations of performing decompression and summing the collected parameters based on the received signal, and the load of the base station may increase. Additionally, as an example, since communication channels must be allocated according to the number of terminals, communication traffic may increase in proportion to the number of terminals in use. Therefore, when there are multiple terminals, the method through compression may reduce efficiency.

For example, when a weight signaling method between the terminal and the base station is used fixedly in the federated learning method, efficiency may vary based on the wireless environment. For example, efficiency may be high in certain environments, but in the opposite case, efficiency may be hindered. Since the wireless environment may change fluidly, there is a need to recognize the fluidly changing wireless environment and select a technology based on the recognized wireless environment. In the following, operations based on the above will be described to increase the efficiency of the wireless environment.

As an example, each terminal may transfer the parameters of a model learned based on a federated learning method (e.g. weights and information of a deep neural network) to the base station. Each terminal transfers compressed parameters, and the base station may update the global model based on Equation 4 below. Here, c may be an information compression and modulation process, and d may be a demodulation and information reconstruction process. Thereafter, the base station may transfer the updated global model to each terminal.

$$g = \frac{\sum_{i=1}^{M} d(c(z_i))}{M} \quad \text{[Equation 4]}$$

More specifically, each terminal may perform compression based on a method that minimizes the amount of model parameters. As an example, compression may be performed based on at least one of weight pruning, quantization, and weight sharing. Additionally, as an example, compression may be performed based on other methods and is not limited to the above-described embodiment. Here, when compression is performed based on an existing neural network, a value required for actual inference among weights may have tolerance to small values. In other words, the weight value required for actual inference may have little effect on small values. Considering the above, weight pruning may set all small weight values to 0. Through this, the neural network can reduce the network model size. Additionally, as an example, quantization may be a method of performing computing by reducing data to a specific number of bits. In other words, data may only be expressed as a specific quantized value. Additionally, as an example, weight sharing may be a method of adjusting weight values based on approximate values (e.g., codebook) and sharing them. Here, when a signal is transmitted in the network, only the codebook and the index for its value may be shared as the information.

Based on any one of the above-described methods, each terminal may perform compression on data and transmit the compressed information to the base station. At this time, the base station may receive the compressed "〖c(z〗_k)" from each terminal, decompress the received information, and calculate and update the parameters of the global model.

Here, each terminal may set local model parameters with individual characteristics. Therefore, when each terminal performs compression, compression efficiency may differ between terminals. Additionally, as an example, each terminal may have different hardware resources. Here, compression efficiency may be affected by hardware resources. Therefore, compression efficiency may differ between terminals.

As a specific example, when a terminal performs quantization in 8 bits, a terminal equipped with a 64-bit operation processing function may achieve high compression efficiency. On the other hand, a terminal equipped with a 16-bit operation processing function may have low compression efficiency. Additionally, as an example, if the terminal is equipped with low-end hardware, the terminal may receive a large compression load. Therefore, it may be advantageous for the above-described terminal to use a simple compression technique. For example, IoT (Internet of Thing) terminals or low-power terminals may be equipped with relatively low-end hardware, and thus simple compression techniques may be used. On the other hand, a terminal operating based on AI or a terminal processing large amounts of data may be equipped with high-end hardware, and thus compression efficiency may be increased by using complex compression techniques. In other words, different compression methods may be used for each terminal, and it may be necessary to use a compression method appropriate for each terminal.

Considering the above, each terminal may use a compression method suitable for the individual characteristics of local model parameters and hardware resources. At this time, the terminals need to transfer information about the compression method to the base station. The base station may reconstruct compressed data and model parameters received from each terminal based on information received from the terminal.

As an example, as the case where the base station and the terminal perform communication through a reflecting surface, the case where Aircomp-type federated learning described above is performed may be considered. When applying Aircomp in a smart communication environment where a plurality of reflecting surfaces exist, optimization may be complicated because all signals from a plurality of terminals are transferred to the reflecting surfaces. Therefore, signaling processing may become difficult. In addition, a method of efficiently performing Aircomp federated learning through a reflecting surface based on an efficient protocol and optimization method may be needed, and the method for this will be described below.

Figure 11:
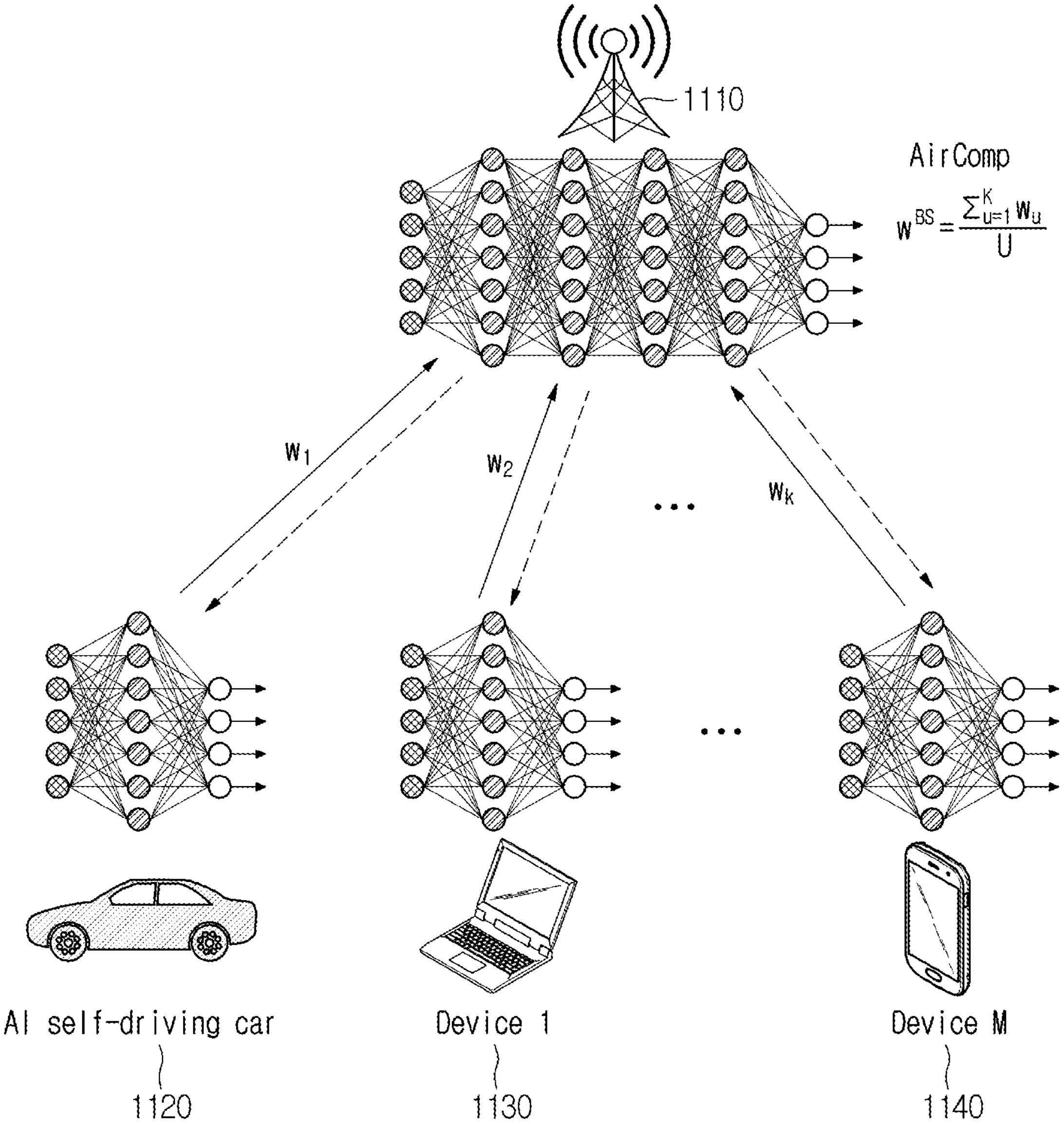
FIG. 11 is a diagram showing a federated learning method according to an embodiment of the present disclosure.

As an example, FIG. 11 is a diagram showing a federated learning method according to an embodiment of the present disclosure. Referring to FIG. 11, federated learning may be performed based on data distributed across a plurality of terminals.

At this time, as an example, when a plurality of terminals 1120, 1130, and 1140 transfers local model update information to a base station 1110 in order to efficiently use uplink resources, the terminals 1120, 1130, 1140 may transfer local model update information to the base station 1110 through a method of computing a global model over the air using the same radio resources, as described above. As an example, in FIG. 11, the plurality of terminals 1120, 1130, and 1140 may be AI self-driving vehicles, smart devices, or other devices, and are not limited to the above-described embodiments.

As an example, federated learning may be divided into the following three steps. At this time, the following three steps may be sequentially repeated until the update value converges to a certain value.

Here, in the first step, each of the terminal 1120, 1130 and 1140 may update the previously received global model $W^{BS}[k-1]$ using its own data and generate a local model $w_u[k]$ As an example, an initial global model may be an untrained initial neural network, but may not be limited thereto. At this time, the update may be performed based on the local model. As an example, Equation 5 below may be a case where the update is performed based on a stochastic gradient method, but the method may not be limited.

$$w_u[k] = w^{BS}[k-1] + \mu\Delta w_u[k] \quad \text{Equation 5}$$

Next, in the second step, each of the terminals 1120, 1130 and 1140 may transfer the updated local model $w_u[k]$ to the base station 1110 through the same radio resource. Here, as an example, the base station 1110 may be connected to a server or cloud server. As an example, for convenience of description, the case where the base station 1110 acts as a server will be focused upon, but may not be limited to this. As an example, the base station 1110 may transfer a global model to the server to combine local models received from a plurality of terminals, and is not limited to the above-described embodiment.

Finally, in the third step, a global model that is a combination of local models may be received by the base station 1110 over the air based on Equation 6 below, and an update may be performed. Thereafter, the base station 1110 may transfer the global model to the plurality of terminals 1120, 1130, and 1140 at time k based on the updated information. As an example, the above-described three steps may be performed repeatedly based on the converged value of the global model or a given number of times.

$$w^{BS}[k] = \sum_{u=1}^{K} w_u[k] \quad \text{[Equation 6]}$$

Here, in a smart communication environment where a plurality of terminals and a plurality of reflecting surfaces exist, a method of performing an update based on the above-described federated learning may be needed. As an example, FIG. 12 is a diagram illustrating a method of performing Aircomp federated learning when a plurality of reflecting surfaces exists according to an embodiment of the present disclosure.

Figure 12:
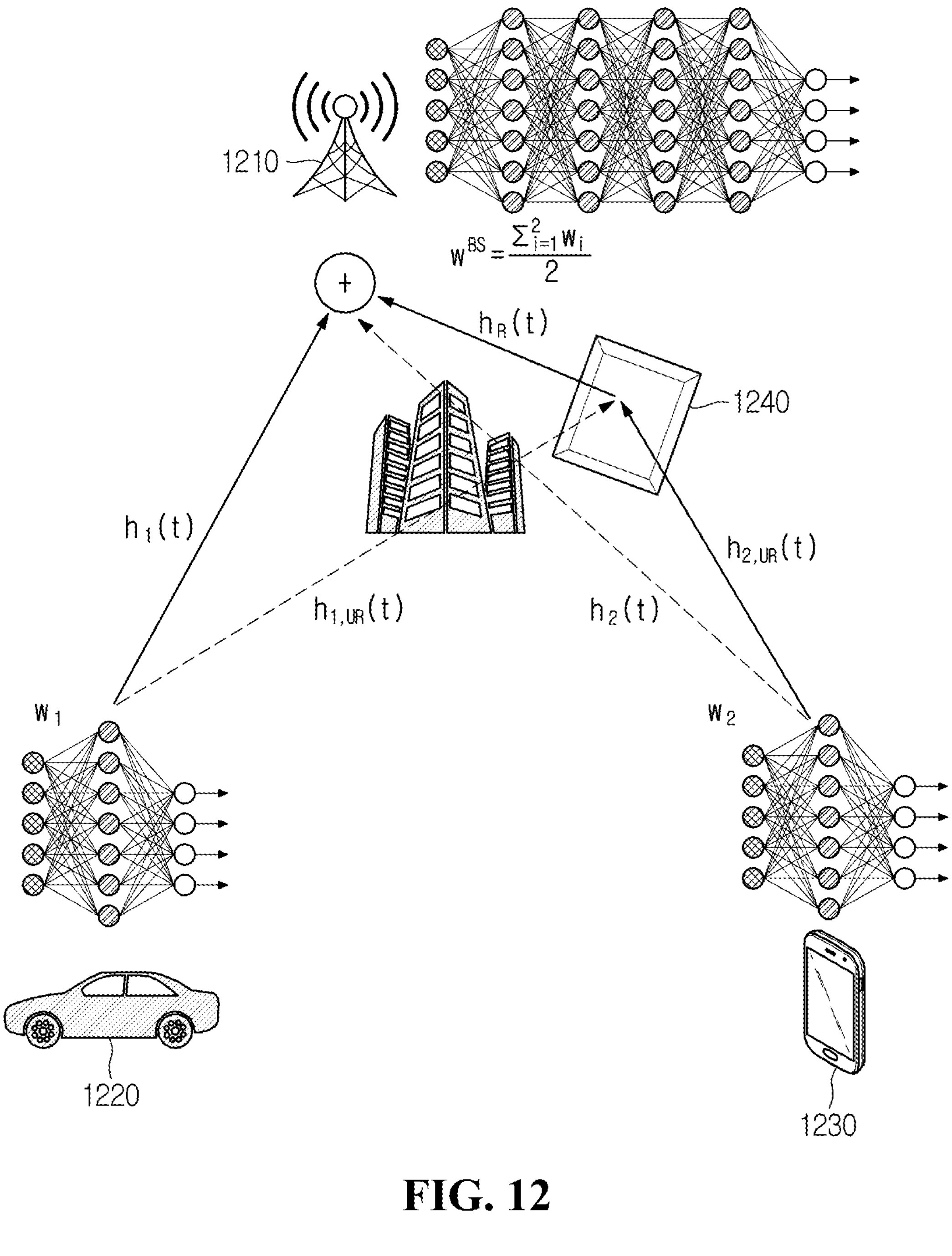
FIG. 12 is a diagram illustrating an air computing federated learning method using a reflecting surface according to an embodiment of the present disclosure.

Referring to FIG. 12, when a plurality of reflecting surfaces exists, a wireless signal received by a base station 1210 may be expressed as a sum of signals received directly from a plurality of terminals 1220 and 1230 and a signal received through a reflecting surface 1240. In particular, in the case of the Aircomp method, since the plurality of terminals 1220 and 1230 use the same radio resources, the complexity of the wireless signal may increase when a plurality of signals is combined. For example, when performing communication in an environment where K terminals and L reflecting surfaces coexist, the signal received by the base station 1210 may be expressed as Equation 7 below. Here, $r_u(t)$ is a received signal that distinguishes between a plurality of terminals, $h_u(t)$ is a channel between a user u and the base station, $$h_R^l(t)$$

is a channel between an l-th reflecting surface and the base station, $\theta^l(t)$ is a reflection phase of the l-th reflecting surface, $$h_{UR,u}^l(t)$$

is a channel between the user u and the l-th reflecting surface, is a signal sent by the user u, and n(t) is received noise.

$$r(t) = \sum_{u=1}^{K} r_u(t) + n(t) = \quad \text{[Equation 7]}$$

$$\sum_{u=1}^{K}\left(h_u(t) + \sum_{l=1}^{K} h_R^l(t)\theta^l(t)h_{UR,u}^l(t)\right) * x_u(t) + n(t)$$

At this time, in Aircomp federated learning, the plurality of terminals 1220 and 1230 perform transmission using a transmission coefficient so that the local models for each of the plurality of terminals 1220 and 1230 are evenly combined over the air. As an example, the transmission signal in which the transmission coefficient is reflected may be expressed as Equation 8 below.

$$x_u(t) = g_u(t)w_u(t) \quad \text{[Equation 8]}$$

Here, the transmission coefficient $g_u(t)$ may be proportional to the inverse of the effect channel of each terminal to minimize a mutual difference due to channel distortion, and may be expressed as Equation 9 below.

$$g_u(t) = \alpha\left(h_u(t) + \sum_{l=1}^{L} h_R^l(t)\theta^l(t)h_{UR,u}^l(t)\right)^{-1} \quad \text{[Equation 9]}$$

Here, α may be a common transmission coefficient for each terminal. As an example, when each of the terminals 1220 and 1230 performs transmission based on Aircomp using the transmission coefficient $g_u(t)$, the signal received by the base station 1210 may in the form of equal summation of the terminal local models as shown in Equation 10 below.

$$r(t) = \alpha\sum_{u=1}^{K} w_u(t) + n(t) \quad \text{[Equation 10]}$$

Here, when federated learning is performed based on the above-described method, complexity may increase based on the reflecting surface, and there may be limitations in implementing it. For example, in order to optimize the reflection phase $\theta^l(t)$ of the l-th reflecting surface described above, channels of all of a plurality of terminals must be considered. In addition, in order to generate the transmission coefficient $g_u(t)$ for each terminal, there is a need to recognize channels $$h_R^l(t) \text{ and } h_{UR,u}^l(t)$$

associated with L reflecting surfaces. In addition, the reflecting surface may have limitations because it only adjusts the angle without implementing a baseband that processes communication signals other than the reflecting surface and a configuration related thereto.

Figure 13:
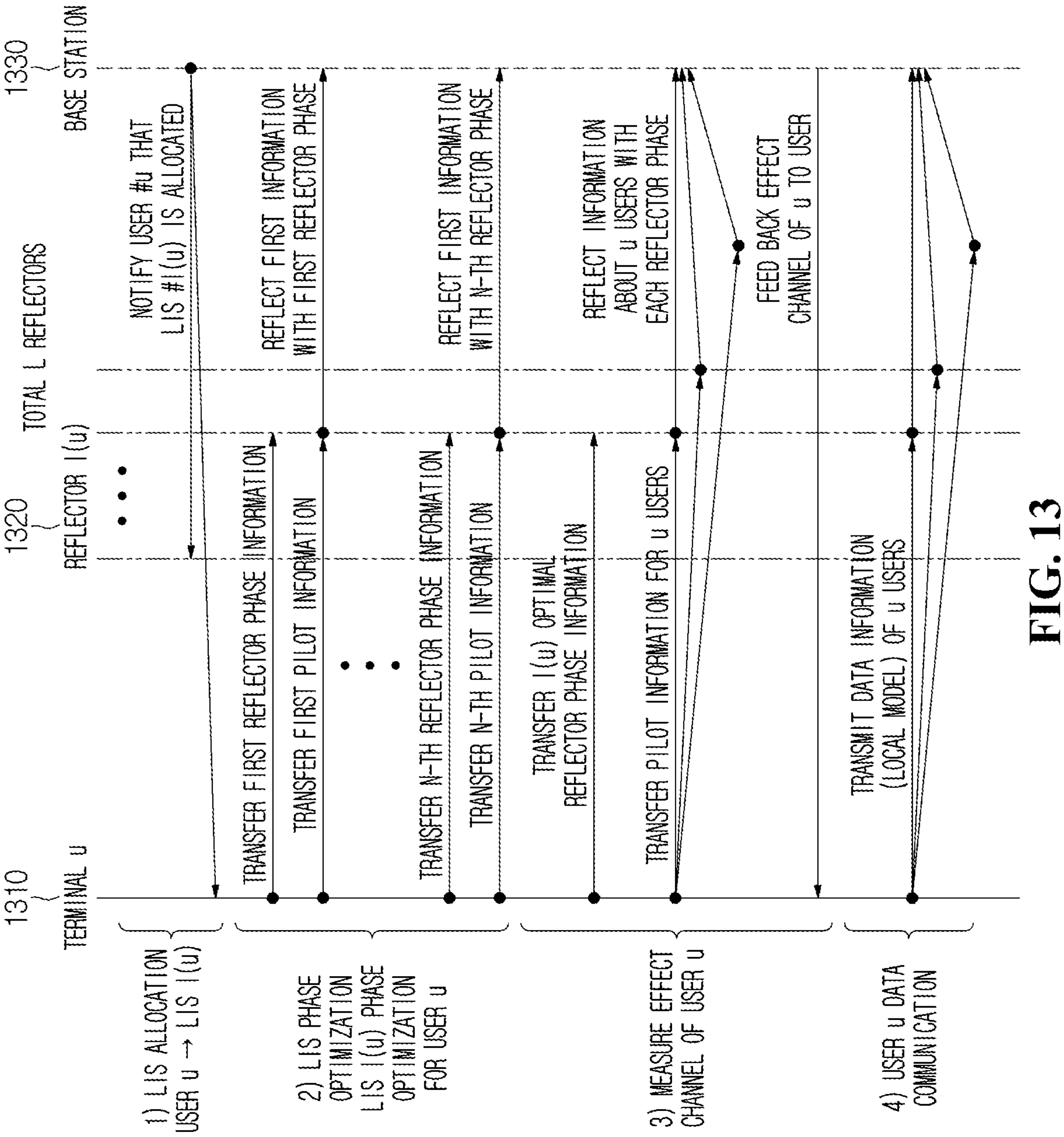
FIG. 13 is a diagram showing a method of performing communication based on a plurality of reflecting surfaces according to an embodiment of the present disclosure.

Considering the above, an efficient federated learning method may be needed in an environment where a plurality of reflecting surfaces exists. As an example, FIG. 13 is a diagram showing a method of performing federated learning by selecting a reflecting surface according to an embodiment of the present disclosure. Referring to FIG. 13, each of a plurality of terminals may select one or less reflecting surfaces. That is, each terminal may select one reflecting surface to transmit a signal to the base station, or may transmit a signal directly to the base station without selecting a reflecting surface.

More specifically, the terminal and base station may determine an optimal reflecting surface based on the reflecting surface. As an example, the base station may select the optimal reflecting surface among a plurality of reflecting surfaces in consideration of the location information of the terminal and transfer information about this to the terminal and the reflecting surface. As another example, the base station may select the optimal reflecting surface by considering the location information of the terminal and the phase of the reflecting surface, and transfer this information to the terminal and the reflecting surface. As another example, the terminal may transmit a reference signal to the base station through each reflecting surface, and the base station may determine the optimal reflecting surface based on the reference signal received from the terminal. Thereafter, the base station may transfer the determined optimal reflecting surface information to the terminal and reflecting surface. Based on the above-described method, each terminal may select one or less reflecting surfaces, and the method of selecting the reflecting surface may not be limited to the above-described embodiment.

Referring to FIG. 13, based on the above, terminal u 1310 may select the an l-th reflecting surface 1320 among L reflecting surfaces. At this time, terminal u 1310 may derive an optimal reflection phase $\theta^{l(u)}(t)$ for the selected reflecting surface 1320 and terminal u 1310. Here, l(u) may be the number of the reflecting surface selected by terminal u 1310. As an example, when maximizing a signal noise ratio (SNR) for a terminal to which one reflecting surface is allocated, the optimal $\theta^{l(u)}(t)$ may be selected based on Equation 11 below. On the other hand, the optimization process of $\theta^{l(u)}(t)$ of Equation 11 may not be performed for terminals that are not associated to the corresponding reflecting surface. That is, each terminal may perform phase optimization based on each associated reflecting surface, and may not perform phase optimization on other reflecting surfaces.

$$\theta_{Opt}^{l(u)}(t) = \arg\max_{\theta^{l(u)}(t)} \left(h_u(t) + h_R^{l(u)}(t)\theta^{l(u)}(t)h_{UR,u}^{l(u)}(t)\right) \quad \text{[Equation 11]}$$

Here, when the optimization process of $\theta^{l(u)}(t)$ is performed, in order to reduce the complexity of the reflecting surface 1320, a random optimization method of transmitting a control signal from the base station 1330 to the reflecting surface to change different phase values for each pilot symbol and then feeding back an index of a pilot symbol with the largest signal among signals transmitted by terminal u 1310 may be applied. More specifically, terminal u 1310 may transmit each pilot signal to the base station 1330 through the selected reflecting surface 1320 based on n pilot signals. As an example, terminal u 1310 may transmit first pilot information along with first reflecting surface phase information to the selected reflecting surface 1320, and the selected reflecting surface 1320 may transmit the first pilot information with the first reflecting surface phase to the base station 1330. Thereafter, terminal u 1310 may transmit the reflecting surface phase information and pilot information to the reflecting surface 1320 equally up to the n-th reflecting surface, and the reflecting surface 1320 may transmit each pilot information to the base station 1330. At this time, the base station may identify the index information of the pilot signal with the largest signal based on the plurality of received pilot information and determine an optimal phase based on this.

Next, after the optimization process of $\theta^{l(u)}(t)$ is performed, terminal u 1310 may fix the phase of the reflecting surfaces participating in signal transmission to the value obtained as described above and transmit an orthogonal uplink pilot signal for each terminal. That is, the base station 1330 receives the orthogonal uplink pilot signal for each terminal and thus may distinguish signals for each terminal. At this time, the base station 1330 may obtain an effect channel for each terminal based on the pilot signal. Thereafter, the base station 1330 may transmit the derived effect channel to each terminal, and the effect channel may be expressed as Equation 12 below.

$$h_{u,eff}(t) = h_u(t) + \sum_{l=1}^{L} h_R^l(t)\theta_{Opt}^l(t)h_{UR,u}^l(t) \quad \text{[Equation 12]}$$

Next, each terminal may derive a transmission coefficient for each terminal based on the effect channel based on Equation 13 below, and transmit local model information to the base station 1330 based on the transmission coefficient. The base station 1330 may perform a global model update based on the local model transmitted from each terminal and transmit it to each terminal, as described above.

$$g_u(kT) = (h_{u,eff}(t))^{-1} \quad \text{[Equation 13]}$$

Figure 14:
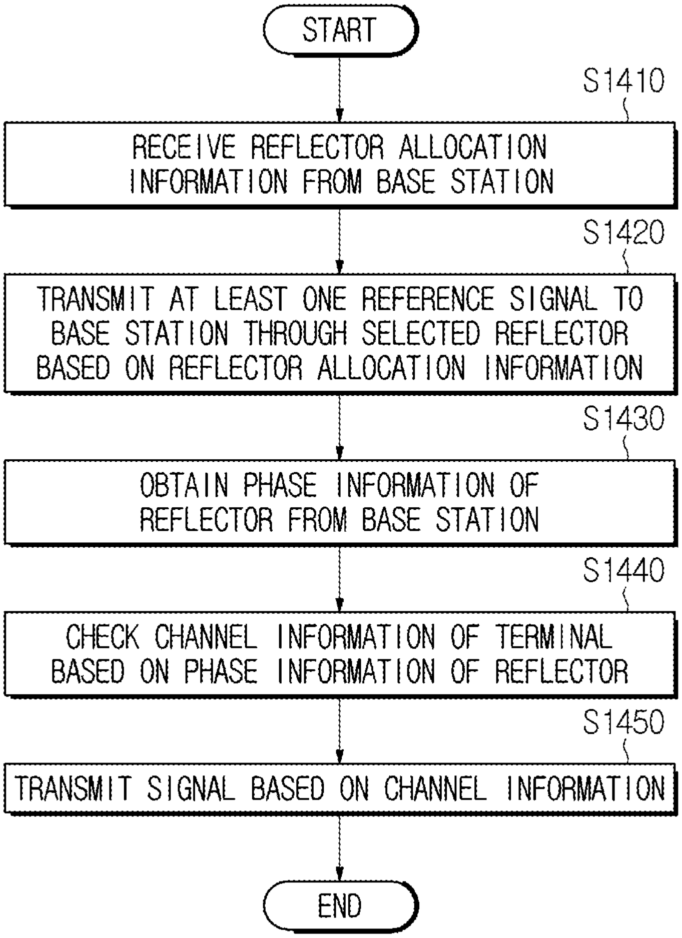
FIG. 14 is a flowchart showing a method of operating a terminal in a wireless communication system according to an embodiment of the present disclosure.

FIG. 14 is a flowchart showing a method of operating a terminal in a wireless communication system according to an embodiment of the present disclosure.

As an example, the terminal may receive reflecting surface allocation information from a base station (S1410). At this time, the base station may perform communication in an environment where a plurality of terminals and a plurality of reflecting surfaces exist. Additionally, each of the plurality of terminals may perform communication based on Air-comp-type federated learning. That is, each of the plurality of terminals may receive global model information from the base station and generate each local model information based on this. At this time, the plurality of terminals may transmit their respective local model information to the base station based on the same radio resource. At this time, the base station may update global model information based on the local model information received from the plurality of terminals, and transmit the updated global model information to the plurality of terminals. At this time, when the plurality of reflecting surfaces exists as described above, communication taking the reflecting surfaces into account may be necessary. As an example, the base station may allocate one or less reflecting surfaces to each terminal and transmit reflecting surface allocation information to each terminal.

At this time, the terminal may transmit at least one reference signal to the base station through a selected reflecting surface based on the reflecting surface allocation information (S1420). At this time, each of the at least one reference signal may have a different phase. As an example, the terminal may transfer information about each of at least one reference signal and each reflecting surface phase information to the reflecting surface, and the reflecting surface may transmit each reference signal to the base station based on the information about each reference signal and the reflecting surface phase information, as described above. Thereafter, the base station may obtain optimal phase information based on at least one reference signal transmitted based on different phases (S1430). At this time, the base station may transmit the optimal phase information to the terminal. As an example, the base station may transmit index information of a reference signal corresponding to the obtained optimal phase information to the terminal. The terminal may receive the index information of the reference signal corresponding to the optimal phase information and identify the channel information based on the phase information of the reflecting surface (S1440). At this time, the channel information may be effect channel information. As an example, each of a plurality of terminals may obtain phase information based on each selected reflecting surface, transmit a reference signal to the base station with the determined phase, and the reference signals may be orthogonal. For example, the reference signal may be the above-described pilot signal, and is not limited to the above-described embodiment. The base station may measure the effect channel for each terminal based on the reference signal received from the plurality of terminals and feed back information about this to each of the plurality of terminals. At this time, each of the plurality of terminals may transmit a signal based on feedback information. That is, the above-described terminal may transmit a signal based on the feedback information (S1450), and the signal may be the above-described local model information of each terminal.

That is, each of the plurality of terminals may select a reflecting surface and a phase of the reflecting surface based on the above, and transmit local model information to the base station through the selected reflecting surface. Thereafter, the base station may perform a global model update based on the received local model information, as described above.

Figure 15:
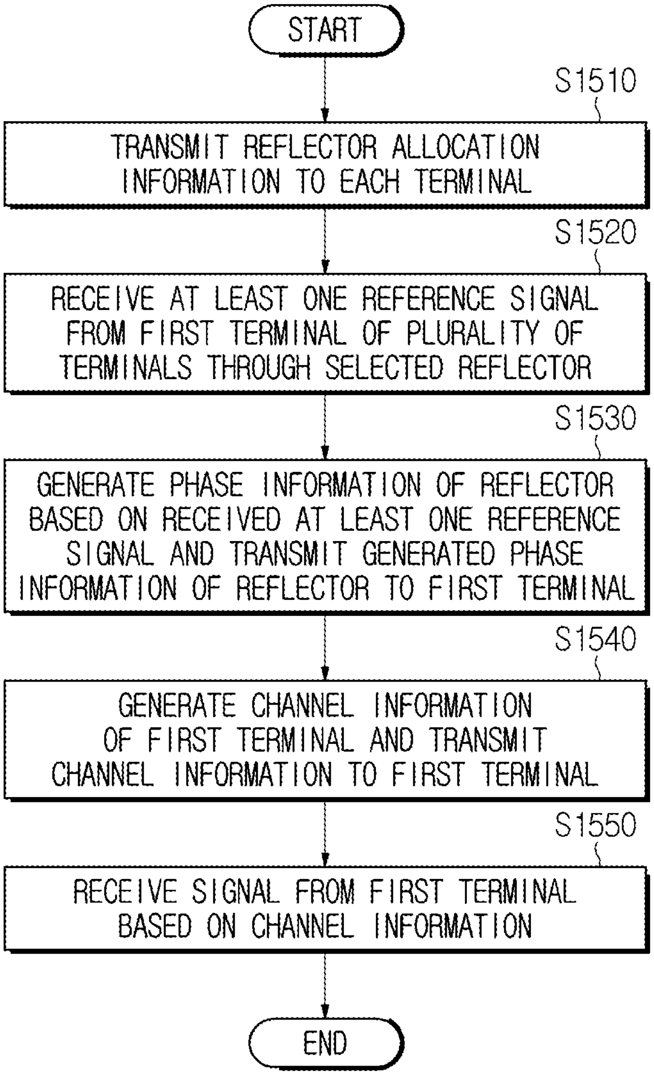
FIG. 15 is a flowchart showing a method of operating a base station in a wireless communication system according to an embodiment of the present disclosure.

FIG. 15 is a flowchart showing a method of operating a base station in a wireless communication system according to an embodiment of the present disclosure.

As an example, the base station may transmit reflecting surface allocation information to each of a plurality of terminals (S1510). At this time, the base station may perform communication in an environment where a plurality of terminals exists and a plurality of reflecting surfaces exists. Additionally, each of the plurality of terminals may perform communication based on Aircomp-type federated learning. That is, each of the plurality of terminals may receive global model information from the base station and generate each local model information based on this. At this time, a plurality of terminals may transmit their respective local model information to the base station based on the same radio resource. At this time, the base station may update the global model information based on the local model information received from the plurality of terminals, and transmit the updated global model information to the plurality of terminals. At this time, when the plurality of reflecting surfaces exists as described above, communication taking the reflecting surfaces into account may be necessary. As an example, the base station may allocate one or less reflecting surfaces to each terminal and transmit reflecting surface allocation information to each terminal.

At this time, as an example, the base station may receive at least one reference signal through a selected reflecting surface from a first terminal among the plurality of terminals (S1520). In addition, the base station may perform the above-described operation on each of the plurality of terminals. At this time, each of the at least one reference signal may have a different phase. As an example, the terminal may transfer information about each of the at least one reference signal and each reflecting surface phase information to the reflecting surface, and the reflecting surface may transmit each reference signal to the base station based on the information about each reference signal and the reflecting surface phase information, as described above. Thereafter, the base station may generate optimal phase information based on at least one reference signal transmitted based on different phases, and transmit the generated optimal phase information (or phase information of the reflecting surface) to the first terminal (S1530). Additionally, the base station may perform the above-described operation on each of the plurality of terminals.

As an example, the base station may transmit, to the terminal, index information of a reference signal corresponding to the obtained optimal phase information. Thereafter, the base station may receive the reference signal from each of the plurality of terminals through each reflecting surface based on the optimal phase information. At this time, the reference signal transmitted from each of the plurality of terminals may be an orthogonal signal, and the base station may generate effect channel information of each of the plurality of terminals through this.

Thereafter, the base station may transmit the channel information of the first terminal to the first terminal (S1540). Additionally, the base station may perform the same operation on a plurality of other terminals. At this time, the channel information may be effect channel information, as described above. Here, as an example, the reference signal may be the above-described pilot signal, and is not limited to the above-described embodiment. The base station may measure the effect channel of each terminal based on the reference signal received from the plurality of terminals and feed back information about this to each of the plurality of terminals. At this time, the base station may receive a signal from the first terminal based on channel information (S1550). Additionally, the base station may perform the same operation from each of a plurality of terminals. At this time, the signal may be the above-described local model information of each terminal, as described above. That is, each of the plurality of terminals may select a reflecting surface and a phase of the reflecting surface based on the above, and transmit local model information to the base station through the selected reflecting surface. Thereafter, the base station may perform a global model update based on the received local model information, as described above.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method performed by a terminal in a wireless communication system, the method comprising:

receiving first control information from a base station;

transmitting at least one reference signal to the base station based on the first control information;

receiving second control information from the base station;

identifying information related to a channel based on the second control information; and transmitting a signal based on the information related to the channel, wherein the at least one reference signal is transmitted through a reflecting surface selected by the terminal based on the first control information, and wherein the second control information includes phase information related to the reflecting surface.

2. The method of claim 1, wherein a plurality of terminals including the terminal performs communication with the base station based on Aircomp federated learning.

3. The method of claim 2, wherein in case that the plurality of terminals perform communication with the base station based on Aircomp federated learning, each of the plurality of terminals generates each local model information based on first global model information, the local model information is transmitted to the base station based on the same radio resource, and wherein the first global model information is updated to second global model information based on the local model information.

4. The method of claim 3, wherein the updated second global model information is transferred to each of the plurality of terminals.

5. The method of claim 4, wherein the signal transmitted based on the information related to the channel includes the local model information of the terminal.

6. The method of claim 5, wherein the base station performs communication based on the plurality of terminals and a plurality of reflecting surfaces, and wherein in case that communication with the plurality of terminals is performed based on Aircomp-type federated learning, one or less reflecting surface is selected for each of the plurality of terminals, and information related to the selected one or less reflecting surface is transferred based on the first control information.

7. The method of claim 1, wherein in case that the terminal transmits the at least one reference signal, each of the at least one reference signal is transmitted to the base station through the reflecting surface with a different phase.

8. The method of claim 7, wherein in case that the terminal transmits a first reference signal of the at least one reference signal, the terminal transfers, to the reflecting surface, information related to the first reference signal and phase information related to the reflecting surface based on the first reference signal, and wherein the reflecting surface transfers the first reference signal to the base station through the information related to the first reference signal and the phase information related to the reflecting surface based on the first reference signal.

9. The method of claim 7, wherein the base station obtains optimal phase information based on the at least one reference signal transmitted based on the different phase, and wherein index information of a reference signal related to the obtained optimal phase information is transmitted to the terminal.

10. The method of claim 9, wherein the terminal selects the reference signal related to the obtained optimal phase information transmitted to the base station based on the index information of the reference signal and transmits the reference signal to the base station, and wherein each of a plurality of terminals including the terminal receives index information of each of reference signals from the base station, selects each of the reference signals based on the index information of each of the reference signals and transmits each of the reference signals to the base station.

11. The method of claim 10, wherein each of the reference signals of the plurality of terminals are orthogonal signals.

12. The method of claim 11, wherein the information related to a channel includes information related to an effect channel, wherein the effect channel is determined based on each of the reference signals received from each of the plurality of terminals.

13. A terminal in a wireless communication system, comprising:

a transceiver; and a processor coupled to the transceiver, wherein the processor is configured to:

receive first control information from a base station;

transmit at least one reference signal to the base station based on the first control information;

receive second control information from the base station;

identify information related to a channel based on the second control information; and transmit a signal based on the information related to the channel, wherein the at least one reference signal is transmitted through a reflecting surface selected by the terminal based on the first control information, and wherein the second control information includes phase information related to the reflecting surface.

14. A base station in a wireless communication system, comprising:

a transceiver; and a processor coupled to the transceiver, wherein the processor is configured to:

transmit first control information to each of a plurality of terminals;

receive at least one reference signal from a first terminal among the plurality of terminals;

generate second control information including phase information related to a reflecting surface based on the at least one reference signal;

transmit the second control information to the first terminal; and receive a signal from the first terminal based on information related to a channel, which is identified by the first terminal based on the second control information, wherein the at least one reference signal is transmitted through the reflecting surface selected by the first terminal based on the first control information, and wherein the second control information includes phase information related to the reflecting surface.

* * * * *